United States Patent
Kim et al.

(10) Patent No.: US 9,366,920 B2
(45) Date of Patent: Jun. 14, 2016

(54) LIQUID CRYSTAL DISPLAY DEVICE AND FABRICATING METHOD THEREOF

(71) Applicant: LG Display Co., Ltd., Seoul (KR)

(72) Inventors: Kyeong Jin Kim, Gyeonggi-do (KR); Jung Im Hwang, Gyeonggi-do (KR); Ji Na Jeon, Incheon (KR); Kyung Su Ha, Gwangju (KR)

(73) Assignee: LG Display Co., Ltd., Seoul (KR)

( * ) Notice: Subject to any disclaimer, the term of this patent is extended or adjusted under 35 U.S.C. 154(b) by 212 days.

(21) Appl. No.: 14/108,643

(22) Filed: Dec. 17, 2013

(65) Prior Publication Data

US 2014/0184984 A1 Jul. 3, 2014

(30) Foreign Application Priority Data

Jan. 2, 2013 (KR) .................. 10-2013-0000396
Jan. 2, 2013 (KR) .................. 10-2013-0000397

(51) Int. Cl.
*G02F 1/1333* (2006.01)
*G02F 1/1343* (2006.01)
*G02F 1/1334* (2006.01)

(52) U.S. Cl.
CPC ........ *G02F 1/134363* (2013.01); *G02F 1/1334* (2013.01)

(58) Field of Classification Search
None
See application file for complete search history.

(56) References Cited

U.S. PATENT DOCUMENTS

| 5,178,571 | A | 1/1993 | Mase |
| 7,898,639 | B2 | 3/2011 | Kim et al. |
| 8,988,642 | B2 | 3/2015 | Lim et al. |
| 2005/0179847 | A1 | 8/2005 | Miyachi et al. |
| 2008/0239198 | A1 | 10/2008 | Kim et al. |
| 2012/0062807 | A1* | 3/2012 | Baek ............ G02F 1/134363 349/33 |
| 2012/0113362 | A1 | 5/2012 | Lim et al. |
| 2012/0113363 | A1 | 5/2012 | Lim et al. |

FOREIGN PATENT DOCUMENTS

| CN | 101281317 A | 10/2008 |
| CN | 102466912 A | 5/2012 |
| CN | 102466929 A | 5/2012 |
| JP | 2004264876 A | 9/2004 |
| KR | 20110095634 A | 8/2011 |

OTHER PUBLICATIONS

Chinese Office Action dated Jan. 27, 2016, in Chinese Patent Application No. 2013107128618.

* cited by examiner

*Primary Examiner* — Richard Kim
(74) *Attorney, Agent, or Firm* — Morgan, Lewis & Bockius LLP

(57) ABSTRACT

Provided are a liquid crystal display (LCD) device and fabricating method thereof. The liquid crystal display device, including a liquid crystal panel, includes: a first substrate, including: a pixel electrode, and a common electrode separated from the pixel electrode, a ratio of a width of the pixel electrode to a distance between the pixel electrode and the common electrode being in a range of about 1:1 to 1:7, and a nanocapsule liquid crystal layer formed on the first substrate, the nanocapsule liquid crystal layer including: a buffer material, and nanocapsules, each filled with liquid crystal molecules.

25 Claims, 22 Drawing Sheets

LIQUID CRYSTAL DISPLAY DEVICE AND FABRICATING METHOD THEREOF

CROSS-REFERENCE TO RELATED APPLICATION(S)

The present application claims benefit and priority under 35 U.S.C. §119(a) of Korean Patent Application No. 10-2013-0000396 and No. 10-2013-0000397, both filed on Jan. 2, 2013, the entire disclosure of each of which is hereby incorporated by reference herein for all purposes.

BACKGROUND

1. Technical Field

The following description relates to a liquid crystal display (LCD) device and a fabricating method thereof which are adapted to prevent light leakage due to external forces, simplify fabricating processes, and enhance response speed.

2. Discussion of the Related Art

Nowadays, a display field has been rapidly developed with the spread of an information society. In accordance therewith, flat panel display devices, including liquid crystal display (LCD) devices, plasma display panel device (PDPs), electroluminescence display devices (ELDs), field emission display devices (FEDs), and so on, have been introduced. Such flat panel display devices have rapidly replaced existing cathode ray tubes (CRTs) display devices and are in the spotlight because of their features, such as slimness, light weight, and low power consumption.

Among the flat panel display devices, the LCD devices are being most actively used in notebook computers, monitors, television receivers, and so on, because of displaying superior motion pictures and having a high contrast ratio.

The configuration of a conventional LCD device will now be described with reference to FIG. 1. FIG. 1 is a cross-sectional view showing a related art LCD device.

With reference to FIG. 1, the LCD device includes an LCD panel and a backlight unit 40 disposed under the LCD panel. The LCD panel includes an array substrate 10 and a color filter substrate combined in such a manner as to face each other with a liquid crystal layer 50 therebetween. One surface of a first substrate 10, referred to herein as the "array substrate," is defined into pixel regions P. Also, the first substrate 10 includes a thin film transistor Tr and a transparent pixel electrode 19 which are provided in each of the pixel regions P. The thin film transistor Tr is connected to the transparent pixel electrode 19 through a contact hole which is formed in an interlayer insulation film 18. Such a thin film transistor Tr includes a gate electrode 12, a gate insulation film 13, an active layer 14, ohmic contact layer 15$a$, 15$b$, a source electrode 16, and a drain electrode 17.

A second substrate 24 opposite to the first substrate 10 with the liquid crystal layer 50 therebetween is referred to herein as an "upper substrate" or the "color filter substrate." A black matrix 22 of a lattice shape is formed on one surface of the second substrate 24. The black matrix 22 is used as a screen for non-display elements, which include thin film transistors Tr of the first substrate 10 and so on, and expose only the transparent pixel electrodes. To this end, the black matrix 22 is formed in such a manner as to rim each of the pixel regions P.

Also, the second substrate 24 further includes red, green, and blue color filters 23 and a transparent common electrode 21. The red, green, and blue color filters 23 are arranged alternately with one another in the pixel regions P of the second substrate 24 which are defined by the lattice. The transparent common electrode 21 is formed to cover the black matrix 22 and the color filters 23.

Polarizing plates 11 and 25 are attached to outer surfaces of the first and second substrates 10 and 24. The polarizing plates 11 and 25 selectively transmit only fixedly polarized light.

A first alignment film 20$a$ is interposed between the liquid crystal layer 50 and the pixel electrodes 19. Also, a second alignment film 20$b$ is interposed between the liquid crystal layer 50 and the common electrode 21. One surface of each of the first and second alignment films 20$a$ and 20$b$ is rubbed in a fixed direction. Such first and second alignment films 20$a$ and 20$b$ enable an initial alignment state and an aligned direction of liquid crystal molecules to be uniformly maintained.

A seal pattern 70 is formed along edges of the first and second substrate 10 and 24. The seal pattern 70 is used to prevent a leakage of the liquid crystal material which is interposed between the first and second substrates 10 and 24.

Such an LCD device is not a self-luminous device. As such, a separate light source is necessary for the LCD device. In accordance therewith, the backlight unit 40 is disposed on the rear surface of the LCD panel and is used to apply light to the LCD panel.

The liquid crystal layer 50 used in the LCD device can include any one of a nematic liquid crystal material, a smectic liquid crystal material, a cholesteric liquid crystal material, and so on. However, the nematic liquid crystal material is mainly used in the liquid crystal layer 50 of the related art LCD device.

Meanwhile, the related art LCD device has a low response speed and causes a residual image to be visible. As such, the related art LCD device deteriorates the image quality. Moreover, many process steps are necessary to complete the related art LCD device. In view of these points, LCD devices each having a high response speed and enhancing process efficiency are being actively researched.

SUMMARY

Accordingly, embodiments of the present application are directed to a liquid crystal display (LCD) device and a fabricating method thereof that substantially obviates one or more problems due to the limitations and disadvantages of the related art An object of embodiments is to provide an LCD device and a fabricating method thereof that are adapted to prevent a light leakage and an optical variation due to external forces other than an electric field by forming a liquid crystal layer which includes nano-sized liquid crystal capsules.

Also, an object of embodiments is to provide an LCD device and a fabricating method thereof that are adapted to increase the yield and reduce processes by forming a liquid crystal layer, which includes nano-sized liquid crystal capsules, on a single substrate and a flexible substrate.

Further, an object of embodiments is to provide an LCD device and a fabricating method thereof that are adapted to enhance process efficiency by forming a liquid crystal layer, which includes nano-sized liquid crystal capsules and is unnecessary for an initial alignment with optical anisotropy, and omitting an alignment film formation process and a rubbing process.

Furthermore, an object of embodiments is to provide an LCD device and a fabricating method thereof that are adapted to provide energy efficient driving by lowering a driving voltage and increasing transmittance through the improvement of the structure of pixel and common electrodes and a driving mode.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a liquid crystal display (LCD) device including a liquid crystal panel, including: a first substrate, including: a pixel electrode, and a common electrode separated from the pixel electrode, a ratio of a width of the pixel electrode to a distance between the pixel electrode and the common electrode being in a range of about 1:1 to 1:7, and a nanocapsule liquid crystal layer formed on the first substrate, the nanocapsule liquid crystal layer including: a buffer material, and nanocapsules, each filled with liquid crystal molecules.

In another aspect, there is provided a method of fabricating a liquid crystal display (LCD) device, the method including: forming a thin film transistor on a first substrate, including: forming a pixel electrode connected to the thin film transistor, and forming a common electrode which is separated from the pixel electrode, forming a nanocapsule liquid crystal layer on the first substrate, and providing a liquid crystal panel, wherein the nanocapsule liquid crystal layer includes: a buffer material, and nanocapsules each filled with liquid crystal molecules, and wherein a ratio of a width of the pixel electrode to a distance between the pixel electrode and the common electrode is in a range of about 1:1 to 1:7.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
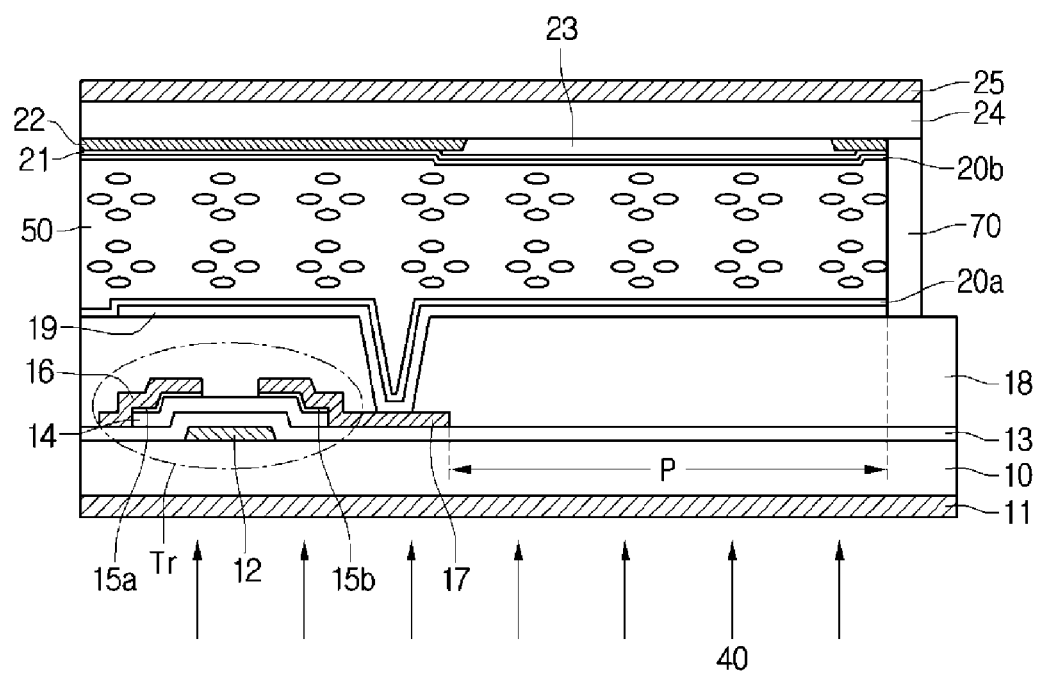
FIG. 1 is a cross-sectional view showing a related art LCD device.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

Hereinafter, embodiments will be described in detail with reference to the accompanying drawings.

Figure 2:
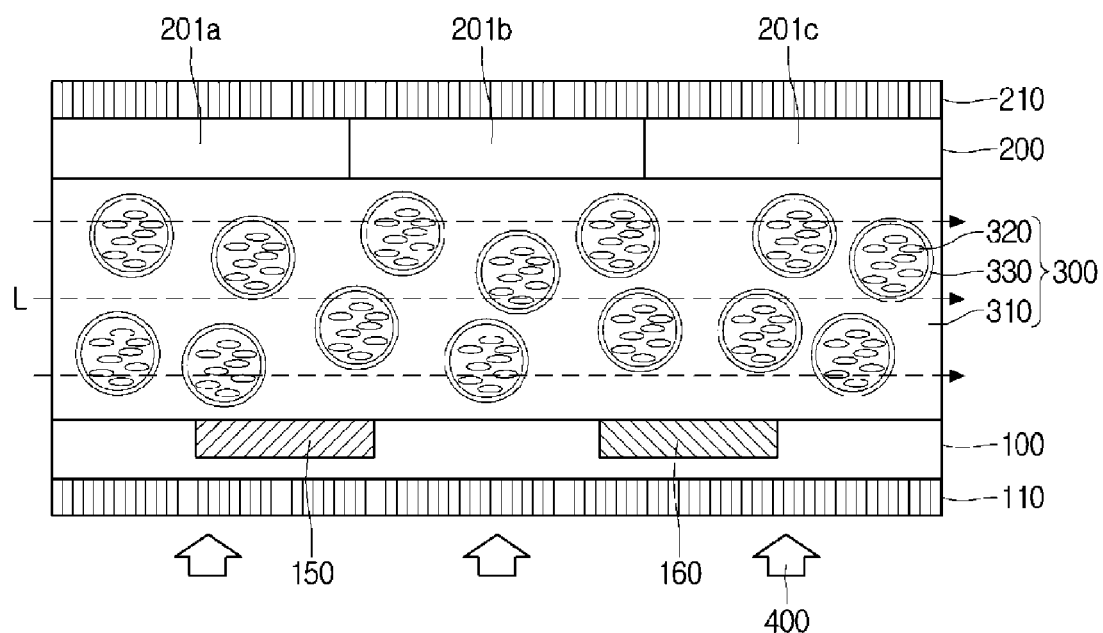
FIG. 2 is a cross-sectional view showing an LCD device according to an embodiment.

FIG. 2 is a cross-sectional view showing an LCD device according to an embodiment.

With reference to FIG. 2, the LCD device according to an embodiment may include a liquid crystal panel, which may be configured with first and second substrates 100 and 200 and a nanocapsule liquid crystal layer 300 interposed between the first and second substrates 100 and 200. Also, the LCD device may include first and second polarizing plates 110 and 210, which may be formed on outer surfaces of the liquid crystal panel. The LCD device may further include a backlight unit 400 disposed on the rear surface of the liquid crystal panel. The first substrate 100 may be a thin film transistor substrate. The second substrate 200 may be used as a color filter substrate.

The first substrate 100 may include gate and data lines which may cross perpendicularly to each other and may define pixel regions. The gate and data lines may be formed on the first substrate 100 with a gate insulation film therebetween. Also, the first substrate 100 may include a thin film transistor formed at each intersection of the gate and data lines. Although not shown in FIG. 2, the thin film transistor may include a gate electrode, the gate insulation film, a semiconductor layer, a source electrode, and a drain electrode. The first substrate 100 may further include a pixel electrode 150 and a common electrode 160 which may be formed in each pixel region. The pixel electrode 150 may come in contact with the respective thin film transistor. The common electrode 160 may be separated from the pixel electrode 150 by a fixed distance.

The second substrate 200 may include a black matrix with a lattice shape. The black matrix may be formed to screen for a non-display region, which may includes the gate lines, the data lines, the thin film transistors, and so on, formed on the first substrate 100. The second substrate 200 may further include red, green, and blue color filters 201a, 201b, 201c. The red, green, and blue color filters 201a, 201b, 201c may be arranged alternately with one another on the second substrate 200 opposite to the pixel regions.

Figure 3:
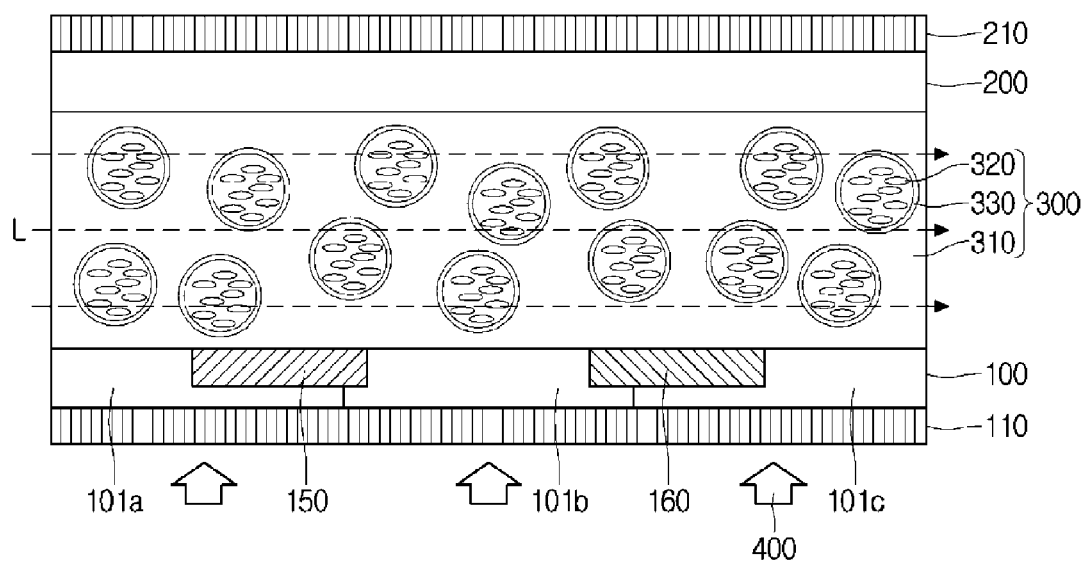
FIG. 3 is a cross-sectional view showing an LCD device according to an embodiment.

FIG. 3 is a cross-sectional view showing an LCD device according to an embodiment.

With reference to FIG. 3, the LCD device according to an embodiment may include a liquid crystal panel, which may be configured with first and second substrates 100 and 200 and a nanocapsule liquid crystal layer 300 interposed between the first and second substrates 100 and 200. Also, the LCD device may include first and second polarizing plates 110 and 210, which may be formed on outer surfaces of the liquid crystal panel. The LCD device may further include a backlight unit 400 disposed on the rear surface of the liquid crystal panel. The first substrate 100 may be formed in a color-filter-on-transistor (COT) structure including thin film transistors and color filters.

For example, the first substrate 100 may include gate and data lines, which may cross perpendicularly to each other and may define pixel regions. The gate and data lines may be formed on the first substrate 100 with a gate insulation film therebetween. Also, the first substrate 100 may include a thin film transistor formed at each intersection of the gate and data lines. Although not shown in FIG. 3, the thin film transistor may include a gate electrode, the gate insulation film, a semiconductor layer, a source electrode, and a drain electrode. A passivation film may be formed on the first substrate 100 provided with the thin film transistors. Red, green, and blue color filters 101a, 101b, 101c may be formed alternately with one another on the passivation film.

The first substrate 100 may further include a pixel electrode 150 and a common electrode 160 which may be formed in each pixel region. The pixel electrode 150 may come in contact with the respective thin film transistor. The common electrode 160 may be separated from the pixel electrode 150 by a fixed distance. Also, the common electrode 160 may serve as a black matrix. In one example, the black matrix may be removed from the liquid crystal panel. As such, an aperture ratio may be enhanced and the fabricating process (or a mask procedure) may be simplified. Such an LCD device including a liquid crystal panel of a color filter-on-thin film transistor (COT) structure may be fabricated to remove the second substrate 200.

Figure 4:
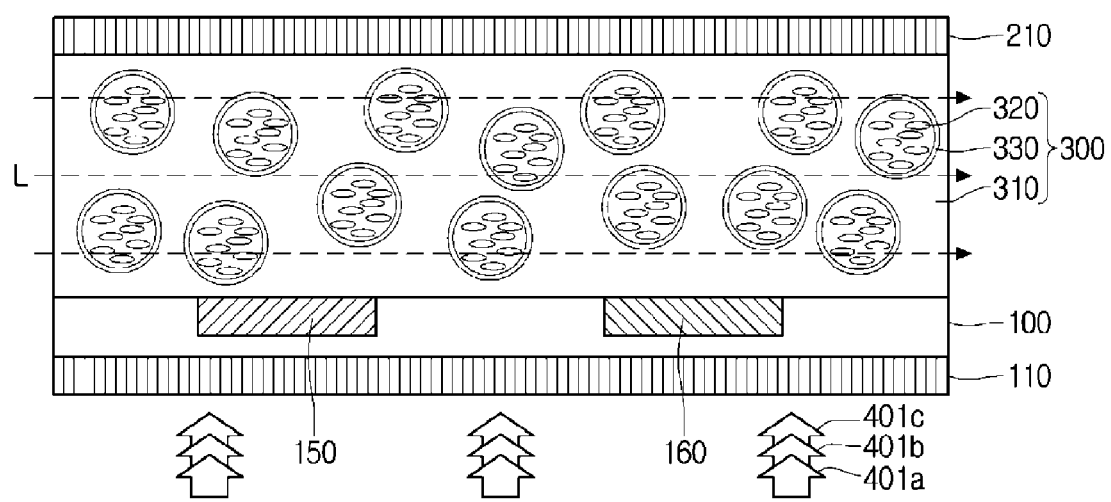
FIG. 4 is a cross-sectional view showing an LCD device according to an embodiment.

FIG. 4 is a cross-sectional view showing an LCD device according to an embodiment.

With reference to FIG. 4, the LCD device according to an embodiment may include a liquid crystal panel, which may be configured with a first substrate 100 used as a lower substrate and a nanocapsule liquid crystal layer 300 formed on the first substrate 100. Also, the LCD device may include first and second polarizing plates 110 and 210, which may be formed on outer surfaces of the liquid crystal panel. The LCD device may further include a backlight unit 400 disposed on the rear surface of the liquid crystal panel.

The first substrate 100 may include gate and data lines, which may cross perpendicularly to each other and define pixel regions. The gate and data lines may be formed on the first substrate 100 with a gate insulation film therebetween. Also, the first substrate 100 may include a thin film transistor formed at each intersection of the gate and data lines. Although not shown in FIG. 4, the thin film transistor may include a gate electrode, the gate insulation film, a semiconductor layer, a source electrode, and a drain electrode. The first substrate 100 may further include a pixel electrode 150 and a common electrode 160 which may be formed in each pixel region. The pixel electrode 150 may come in contact with the respective thin film transistor. The common electrode 160 may be separated from the pixel electrode 150 by a fixed distance.

The LCD device according to an embodiment may remove an upper substrate, e.g., the upper substrate 200 of the examples of FIGS. 2 and 3. As such, the second polarizing plate 210 may come in direct contact with the nanocapsule liquid crystal layer 300. Moreover, the backlight unit 400 may include light sources emitting red light, green light, and blue light. The LCD device according to an embodiment may realize a variety of colors using the red, green, and blue light sources. As such, a color filter layer (e.g., the red, green, and blue color filters 201a, 201b, 201c of the FIG. 2 example; or the red, green, and blue color filters 101a, 101b, 101c of the FIG. 3 example) may also be removed from the LCD device. In accordance therewith, the entire thickness of the LCD device may be reduced.

Also, a separate process for combining the second substrate with the first substrate 100 may not be necessary for the LCD device according to an embodiment. Therefore, process efficiency may be enhanced.

The LCD devices according to the FIG. 2-4 examples have the same configuration except for the first and second substrates 100 and 200. The same configuration commonly included in the LCD devices of embodiments will now be described with reference to FIGS. 2 through 4.

With reference to FIGS. 2 through 4, the backlight unit 400 for applying light may be disposed on the liquid crystal panel. The backlight unit 400 may be classified into a side type or a direct type, according to the position of a light source emitting light. The side-type backlight unit may allow light of a light source output from one rear edge of the liquid crystal panel to be reflected by a separate light guide plate and applied to the liquid crystal panel. Meanwhile, the direct-type backlight unit may include a plurality of light sources arranged on the rear surface of the liquid crystal panel and may allow the plurality of light sources to apply light to the liquid crystal panel. Embodiments may use any one of the side-type and direct-type backlight units.

As an example of the light source, a fluorescent lamp, such as a cold cathode fluorescent lamp or an external electrode fluorescent lamp, may be used. Alternatively, a light emitting diode lamp may be used as the light source.

The first and second polarizing plates 110 and 210, selectively transmitting only fixedly polarized light, may be attached to the outer surfaces of the liquid crystal panel. The first polarizing plate 110 may have a first polarization axis proceeding along a first direction. The second polarizing plate 210 may have a second polarization axis proceeding along a second direction perpendicular to the first direction. The first polarizing plate 110 may transmit linear polarization light, which may be parallel to the first polarization axis, among scattered light output from the backlight unit 400 and may absorb the rest of the scattered light. The second polarizing plate 210 may transmit linear polarization light, which may be parallel to the second polarization axis, among light passed through the nanocapsule liquid crystal layer 300.

The nanocapsule liquid crystal layer 300 may include a buffer layer 310 and nanocapsules 330 scattered into the buffer layer 310. Each of the nanocapsules 330 may be filled with non-uniformly aligned liquid crystal molecules 320. The nanocapsule 330 may be formed in a nano size and used to encapsulate the liquid crystal molecules 320. The nanocapsule 330, the liquid crystal molecules 320, and the buffer layer 310 may control the light transmission quantity of the nanocapsule liquid crystal layer 300 and may display an image.

The nanocapsules 330, each including the liquid crystal molecules 320, may occupy a range of about 5~95 percent by volume (e.g., "volume %" or "vol %") of the nanocapsule liquid crystal layer 300. For example, the nanocapsules 330 may occupy a range of about 25~65 volume % with respect to the entire volume of the nanocapsule liquid crystal layer 300. The remaining volume % of the nanocapsule liquid crystal layer 300 may be occupied by the buffer layer 310.

The buffer layer 310 may be formed from one of transparent and semi-transparent materials. Also, the buffer layer 310 may have one of a water-soluble property, an oil-soluble property, and a mixed property thereof. Moreover, the buffer layer 310 may be hardened by one of heat and ultra-violet rays. In order to increase the strength of the buffer layer 310 and reduce the hardening time of the buffer layer 310, an additive may be further included in the buffer layer 310.

Such a buffer layer 310 may be formed to have a refractive index very close to that of the nanocapsule 330, in order to minimize dispersion of light in the interface between the buffer layer 310 and the nanocapsule 330. Also, the buffer layer 310 may be formed from a material which has a difference range of 0.1 from the mean refractive index of the liquid crystal 320. The mean refractive index of the liquid crystal molecule 320 may be defined by ne+(2×no), wherein, "ne" corresponds to a refractive index in a major axis direction of the liquid crystal molecule 320, and "no" is a refractive index in a minor axis direction of the liquid crystal molecule 320.

The nanocapsule 330 may be formed in a diameter range of about 1 nm~320 nm. In other words, the nanocapsule 330 may be formed in a smaller size than the wavelength of visible light, e.g., no more than 320 nm. Also, the liquid crystal molecules 320 within the nanocapsule 330 may be randomly aligned. As such, an optical variation due to the refractive index may not be generated. In other words, isotropic optics may be obtained. Moreover, dispersion of visible light may be minimized. For example, the nanocapsule 330 may be formed in a diameter range of about 30 nm~100 nm. If the nanocapsule 330 is formed to be no more than 100 nm, a high contrast ratio may be obtained.

The nanocapsule liquid crystal layer 300 may be formed from an isotropic liquid crystal material. The isotropic liquid crystal material may have optical isotropy in a three dimensional space or a two dimensional plane when a voltage is not applied. On the contrary, if an electric field is applied, the isotropic liquid crystal molecules within the nanocapsule liquid crystal layer 300 may be re-aligned in a direction of the electric field and the nanocapsule liquid crystal layer 300 may have a birefringent property. In other words, the nanocapsule liquid crystal layer 300 may form an optical axis in accordance with to the applied electric field. Therefore, light may be transmitted through by controlling the optical properties of the nanocapsule liquid crystal layer 300.

For example, scattered light output from the backlight unit 400 may pass through the first polarizing plate 110. Among light passed through the first polarizing plate 110, linear polarization light parallel to an alignment direction of the liquid crystal molecules may be transmitted through the nanocapsule liquid crystal layer 300. Light output from the nanocapsule liquid crystal layer 300 may pass through the second polarizing plate 210 and may allow a normal white to be displayed.

When the voltage is not applied, the liquid crystal molecules 320 of the nanocapsule liquid crystal layer 300 positioned between polarizing plates, whose optical axes are perpendicularly crossed with each other, may be aligned in an arbitrary direction within the nanocapsules 330. As such, the nanocapsule liquid crystal layer 300 may have optical isotropy. In other words, the liquid crystal molecules 320 within the nanocapsules 330 may not affect the optical properties of light output from the backlight unit 400 in the state in which the voltage is not applied. In accordance therewith, light output from the backlight unit 400 may be shielded by the polarizing plates whose optical axes are perpendicularly crossed with each other and may allow a normal black to be displayed.

Such an LCD device, including the nanocapsule liquid crystal layer 300, may be applied to a display device which controls light transmittance (or light transmission quantity) according to the application/non-application state of the voltage. Also, the liquid crystal molecules 320 of the nanocapsule liquid crystal layer 300 may be dynamically twisted. As such, the response time of the LCD device may become faster.

Figure 5:
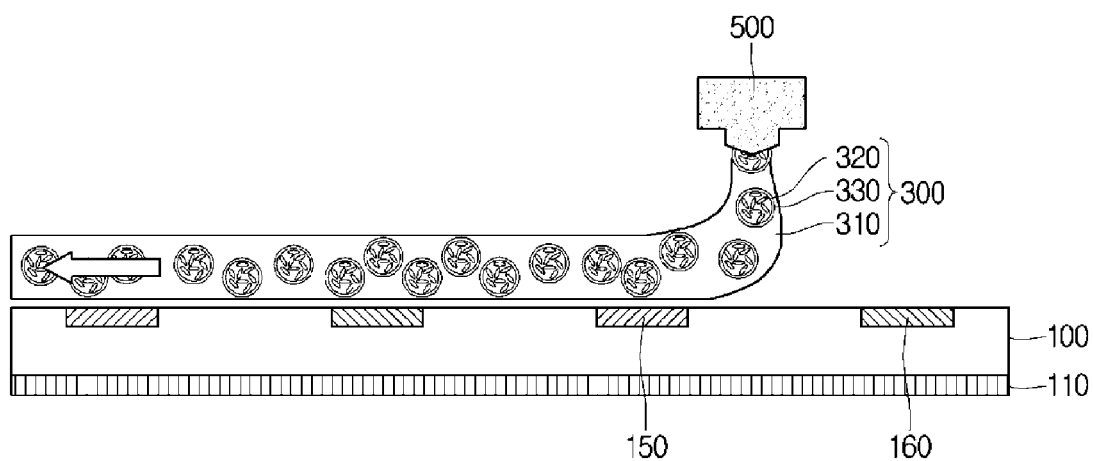
FIG. 5 is a cross-sectional view illustrating a formation process of a liquid crystal layer of the LCD device according to an embodiment.

FIG. 5 is a cross-sectional view illustrating a formation process of a liquid crystal layer of an LCD device according to an embodiment.

With reference to FIG. 5, the nanocapsule liquid crystal layer 300 may be formed by preparing a coating paste, which may be obtained by mixing a buffer material and the nanocapsules 330 each encapsulating the liquid crystal molecules 320, and by coating the coating paste on the first substrate 100 using a nozzle-type dropping device 500. For example, the first polarizing plate 110 may be attached to the lower surface of the first substrate 100. The pixel electrode 150 and the common electrode 160 may be formed on each pixel region of the first substrate 100 to be separated from each other. The nanocapsule liquid crystal layer 300 may be formed by positioning the dropping device 500 over the first substrate 100 provided with the pixel and common electrodes 150 and 160 and by coating the coating paste on the first substrate 100 using the dropping device 500.

Also, the nanocapsule liquid crystal layer 300 including the nanocapsules 330, the liquid crystal molecules 320 within the nanocapsules 330, and the buffer layer 310 may be formed using a variety of formation methods, such as a printing method, a coating method, a dropping method, and so on.

Such a nanocapsule liquid crystal layer 300 may not have an initial alignment state with optical anisotropy. As such, an alignment process may not be necessary for the LCD devices according to embodiments. In accordance therewith, alignment films may be omitted in the LCD devices according to embodiments and it may be unnecessary to perform a rubbing process. Therefore, process efficiency may be enhanced.

Figure 6A:
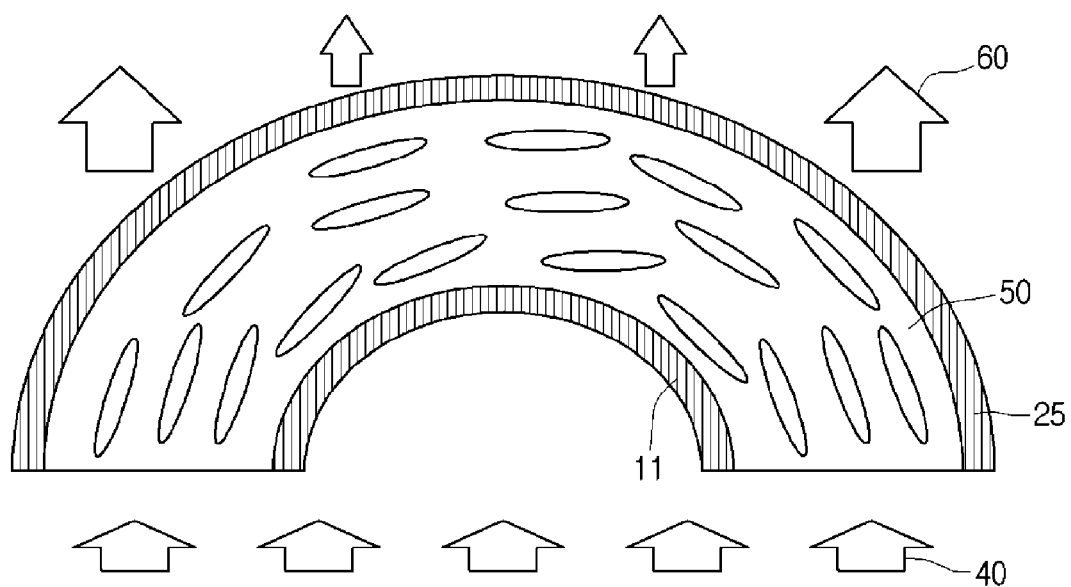
FIG. 6A is a cross-sectional view of a related art LCD device which includes a flexible substrate.
Figure 6B:
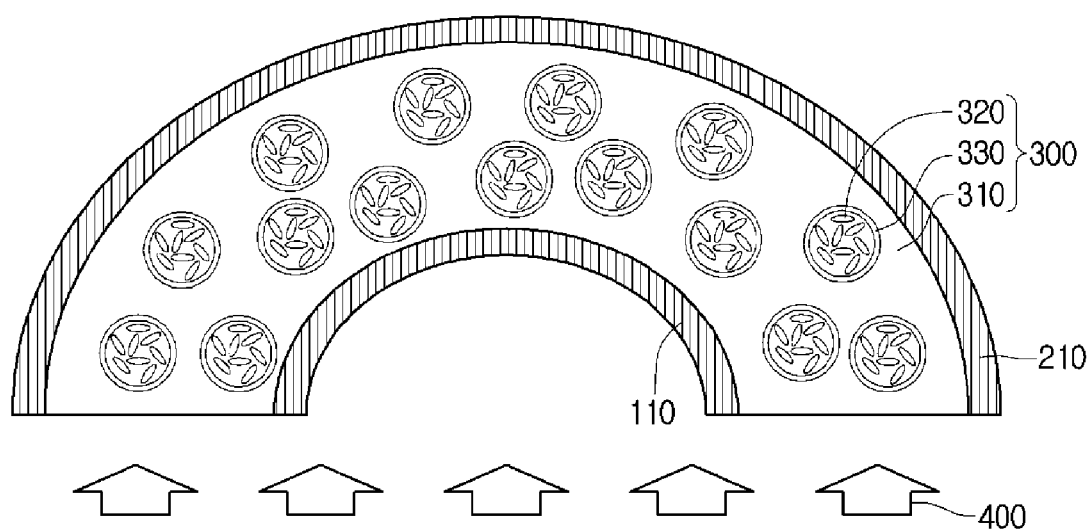
FIG. 6B is a cross-sectional view of an LCD device according to an embodiment which includes a flexible substrate.

FIG. 6A is a cross-sectional view of a related art LCD device which includes a flexible substrate. FIG. 6B is a cross-sectional view of an LCD device according to an embodiment which includes a flexible substrate.

As shown in FIG. 6A, the related art LCD device can be applied to one of a flexible panel and a curved panel. In this case, light leakage can be generated in the related art LCD device. The flexible panel or the curved panel is formed through a process of bending the respective panel toward a direction.

The bending process causes not only a stress reacting against a direction, in which an upper substrate and a polarizing plate 25 attached thereto are extended, to be generated in the upper substrate and the upper polarizing plate 25, but also another stress reacting against another direction, in which a lower substrate and another polarizing plate 11 attached thereto are contracted, to be generated in the lower substrate and the lower polarizing plate 11. The stresses acting in opposite directions to each other induce the upper and lower substrates to move or to be deformed in the opposite directions to each other. However, edges of the upper and lower substrates are fastened to each other. As such, a torsional tension (or stress) must be generated.

Due to this, misalignment of the substrate is generated, rubbing axes of the upper and lower substrates are distorted, and arrangement of the liquid crystal molecules is broken. In accordance therewith, light leakage is generated in the related art LCD device. The light leakage is regarded as a serious problem in the IPS mode LCD device which forms a horizontal electric field using the common and pixel electrodes. Also, the IPS mode LCD device allows the liquid crystal molecules within the liquid crystal layer 50 to be aligned in a horizontal direction. As such, the IPS mode LCD device must be very sensitive to the distortion of an optical axis.

In other words, the light leakage generated in the related art LCD device having one of the flexible panel and the curved panel causes light output from the backlight unit 40 not to be completely shielded. Due to this, a normal black cannot be displayed in the related art LCD device.

Although the LCD device according to embodiments may be applied to one of a flexible panel and a curved panel, as shown in FIG. 6B, the light leakage may not be generated. For example, the first substrate including the first polarizing plate 110 and the second substrate including the second polarizing plate 210 may be bent through a bending process. Nevertheless, the nanocapsule liquid crystal layer 300 may not be affected by visible light. This may result from the fact that the liquid crystal molecules 320 are encapsulated within the nanocapsules 330 which may be smaller than the wavelength of visible light. Therefore, the light leakage may not be generated even though the first and second substrates 100, 200 are bent.

Figure 7A:
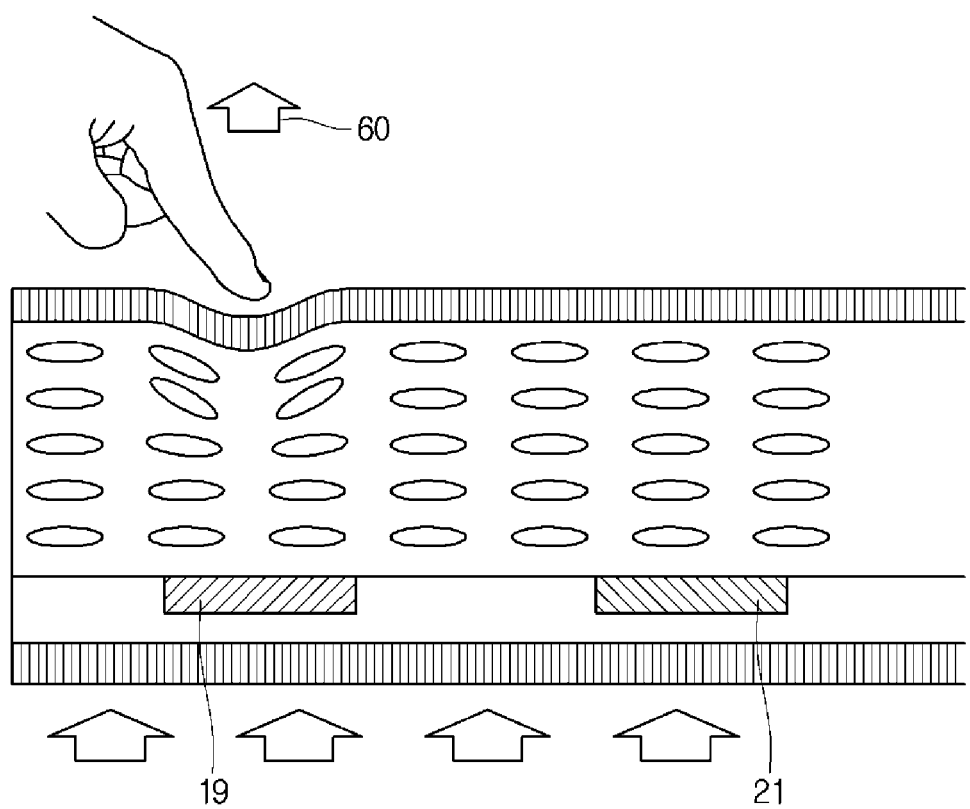
FIG. 7A is a cross-sectional view of a state of a related art LCD device caused by an external force.
Figure 7B:
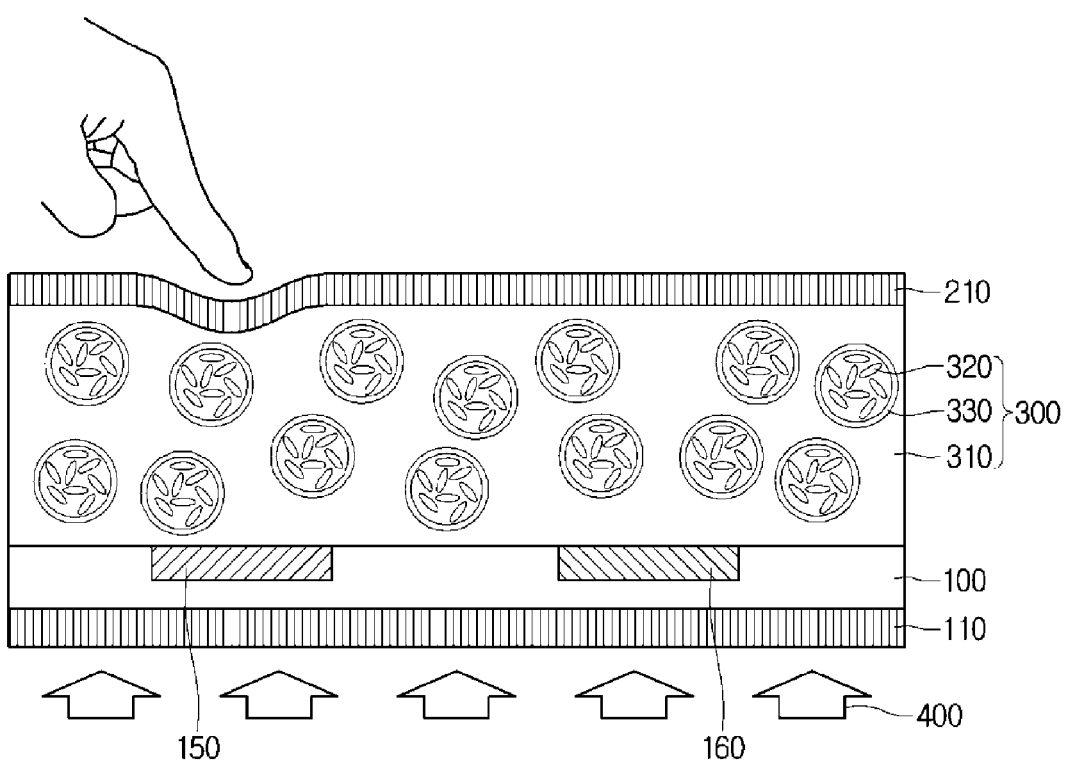
FIG. 7B is a cross-sectional view of a state of an LCD device according to an embodiment caused by an external force.

FIG. 7A is a cross-sectional view of a state of a related art LCD device caused by an external force. FIG. 7B is a cross-sectional view of a state of an LCD device according to an embodiment caused by an external force.

If an external force is applied to the related art LCD device as shown in FIG. 7A, the light leakage is generated. The external force applied to the liquid crystal panel affects arrangement of the liquid crystal molecules. In other words, the external force causes not only the arrangement of the liquid crystal molecules to be partially broken but also optical axes to be partially distorted. Due to this, the light leakage is generated. Particularly, the IPS mode LCD device, which forms a horizontal electric field using the common and pixel electrodes, allows the liquid crystal molecules to be aligned in a horizontal direction. Therefore, the related art IPS mode LCD device is largely affected by the partially broken arrangement of the liquid crystal molecules which is caused by the external force.

On the other hand, the LCD device according to embodiments may not generate the light leakage, even though an external force may be applied, as shown in FIG. 7B. For example, the LCD device according to embodiments may allow the liquid crystal molecules 320 to be encapsulated within the nanocapsules 330 which may be smaller than the wavelength of visible light. As such, the nanocapsule liquid crystal layer 300 may not be affected by visible light. Therefore, the light leakage may not be generated even though the external force may be applied.

Such driving mode and structure of the pixel and common electrodes may be improved in order to enhance efficiency of the driving voltage and transmittance which may be provided by the above-mentioned LCD devices. The improved structure of the electrodes and the improved driving mode will now be described with reference to FIGS. 8 through 14.

Figure 8:
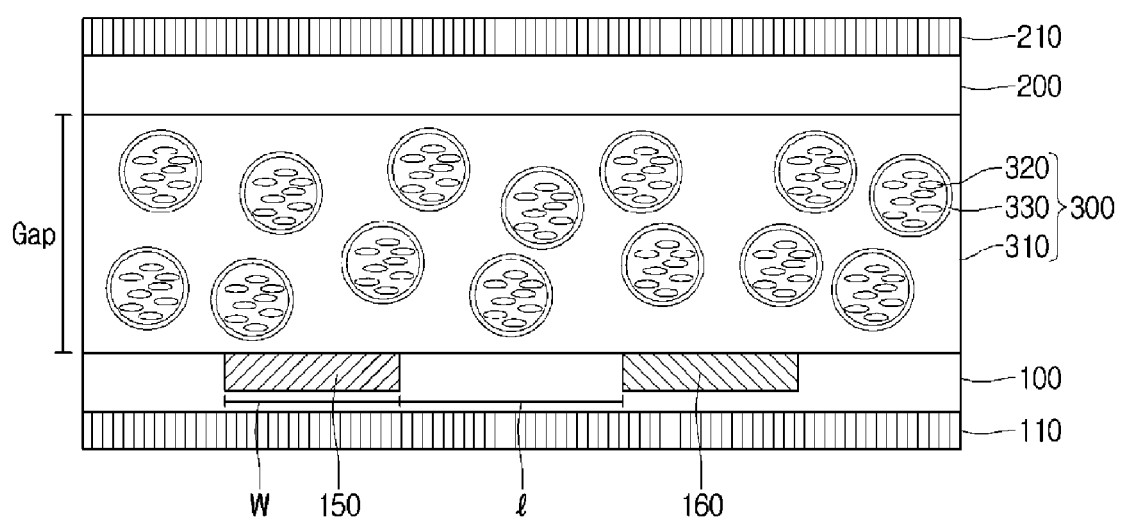
FIG. 8 is a cross-sectional view showing an LCD device according to an embodiment.

FIG. 8 is a cross-sectional view showing an LCD device according to an embodiment.

With reference to FIG. 8, first and second substrates 100 and 200 may be disposed to face each other. A nanocapsule liquid crystal layer 300 may be interposed between the first and second substrates 100 and 200. The nanocapsule liquid crystal layer 300 may be formed from a buffer material and nanocapsules 330 each encapsulating liquid crystal molecules 320. A first polarizing plate 110 may be attached to the outer surface of the first substrate 100. A second polarizing plate 210 may be attached to the outer surface of the second substrate 200.

Also, a pixel electrode 150 and a common electrode 160 may be formed in each pixel region of the first substrate 100 to be separated from each other. The pixel electrode 150 and the common electrode 160 may be formed in the same width. For convenience of explanation, the width of the pixel electrode 150 or the common electrode 160 is referred to as "W", the distance between the pixel electrode 150 and the common electrode 160 is referred to as "l", and the thickness of the nanocapsule liquid crystal layer 300 is referred to as "Gap".

Figure 9:
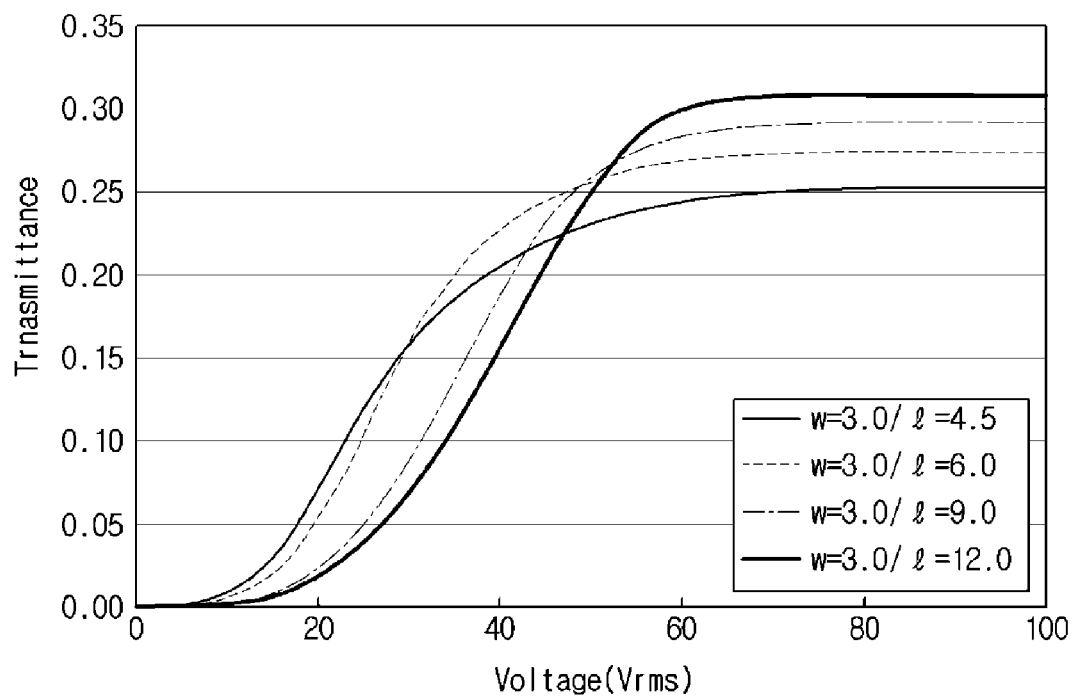
FIG. 9 is a graph illustrating a relationship between transmittance and driving voltage according to the electrode width and the distance between electrodes.

FIG. 9 is a graph illustrating a relationship between transmittance and driving voltage according to the electrode width and the distance between electrodes.

As shown in FIG. 9, transmittance with respect to the driving voltage may vary along the ratio of the width W of the pixel electrode 150 or the common electrode 160 and the distance between the pixel and common electrodes 150, 160 when the thickness of the nanocapsule liquid crystal layer is fixed to 4 μm. As such, the ratio of the width W of the pixel electrode 150 or the common electrode 160 and the distance l between the pixel and common electrodes 150, 160 may be set to a range of about 1:1~1:7 based on the FIG. 9 graph. For example, the ratio of the width W of the pixel electrode 150 or the common electrode 160 and the distance l between the pixel and common electrodes 150, 160 may be set to 1:2. As another example, the width W of the pixel electrode 150 or the common electrode 160 may be in a range, e.g., of 1.0~10.0 μm, and the distance l between the pixel and common electrodes 150, 160 may be in a range, e.g., of 1.0~70.0 μm.

Figure 10:
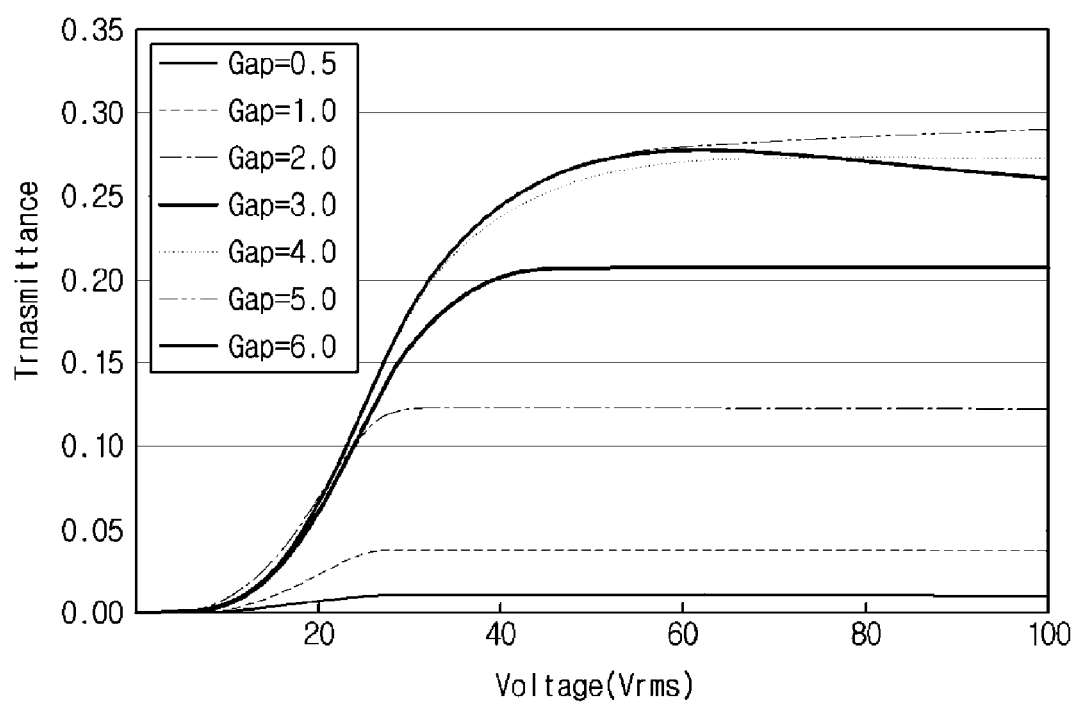
FIG. 10 is a graph illustrating a relationship between transmittance and driving voltage according to a thickness of a liquid crystal layer with nano-sized capsules.

FIG. 10 is a graph illustrating a relationship between transmittance and driving voltage according to a thickness of a liquid crystal layer with nano-sized capsules.

The width W of the pixel electrode 150 or the common electrode 160 may be fixed, e.g., at 3.0 μm, and the distance l between the pixel and common electrodes 150 and 160 may be fixed, e.g., at 6.0 μm. In one example, transmittance of the liquid crystal panel may become higher as shown in FIG. 10, as the thickness of the nanocapsule liquid crystal layer 300 increases. As such, the nanocapsule liquid crystal layer 300 may be formed with a thickness, e.g., larger than 1 μm but smaller than 10 μm. The nanocapsule liquid crystal layer 300 with a thickness of at least 1 μm can be applied to the LCD device. For example, the nanocapsule liquid crystal layer 300 with a thickness of at least 3 μm may be applied to the LCD device, in order to secure the highest possible transmittance. The condition may be altered along with the kind of liquid crystal, the structure of electrodes, and design specification. Therefore, the nanocapsule liquid crystal layer 300 may be set to an optimized thickness based on several applicable conditions.

Figure 11A:
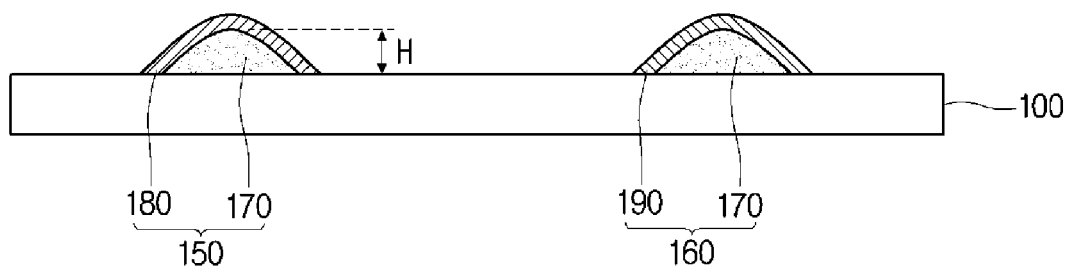
FIGS. 11A and 11B are cross-sectional views showing protrusive electrodes.
Figure 11B:
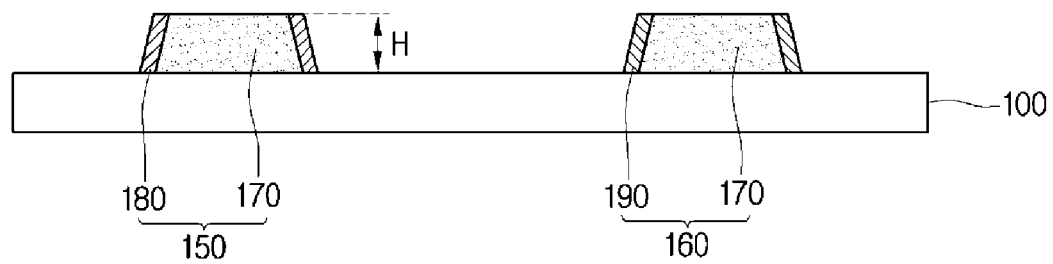

FIGS. 11A and 11B are cross-sectional views showing protrusive electrodes.

The pixel and common electrodes 150 and 160 on the first substrate 100 of the LCD device according to an embodiment may be formed in a protrusive shape other than the single layer type, as shown in FIGS. 11A and 11B. The pixel electrode 150 with the protrusive shape may be formed by stacking a protrusion 170 and a first conductive layer 180. Similarly, the common electrode 160 with the protrusive shape may be formed by stacking another protrusion 170 and a second conductive layer 190.

The first and second conductive layers 180 and 190 may be formed in such a manner as to encompass the protrusions 170. Alternatively, the first and second conductive layers 180 and 190 may be formed on one of upper and side surfaces of the protrusion 170. Also, the first and second conductive layer 180 and 190 may be formed from the same material and through the same process.

With reference to FIG. 11A, the protrusion 170 of the pixel and common electrodes 150 and 160 may have a convex hill shape with a height H. In other words, each of the pixel and common electrodes 150 and 160 may be formed in a convex hill shape. The protrusion 170 used in the formation of the protrusive electrode may be formed from an acrylic based resin, such as a positive photoresist or a negative photoresist, which may be patterned through a photolithography process.

As shown in FIG. 11B, the protrusion 170 of the pixel and common electrodes 150 and 160 may have a trapezoid shape with a height H. The protrusion 170 used in the formation of the protrusive electrode may be formed from a passivation layer (a silicon nitride $SiN_x$) which may be patterned through a photolithography process. This protrusive electrode may be formed in a minimized width, e.g., no more than 1 μm. Also, the inclined angle of this protrusive electrode may be precisely controlled.

Figure 12A:
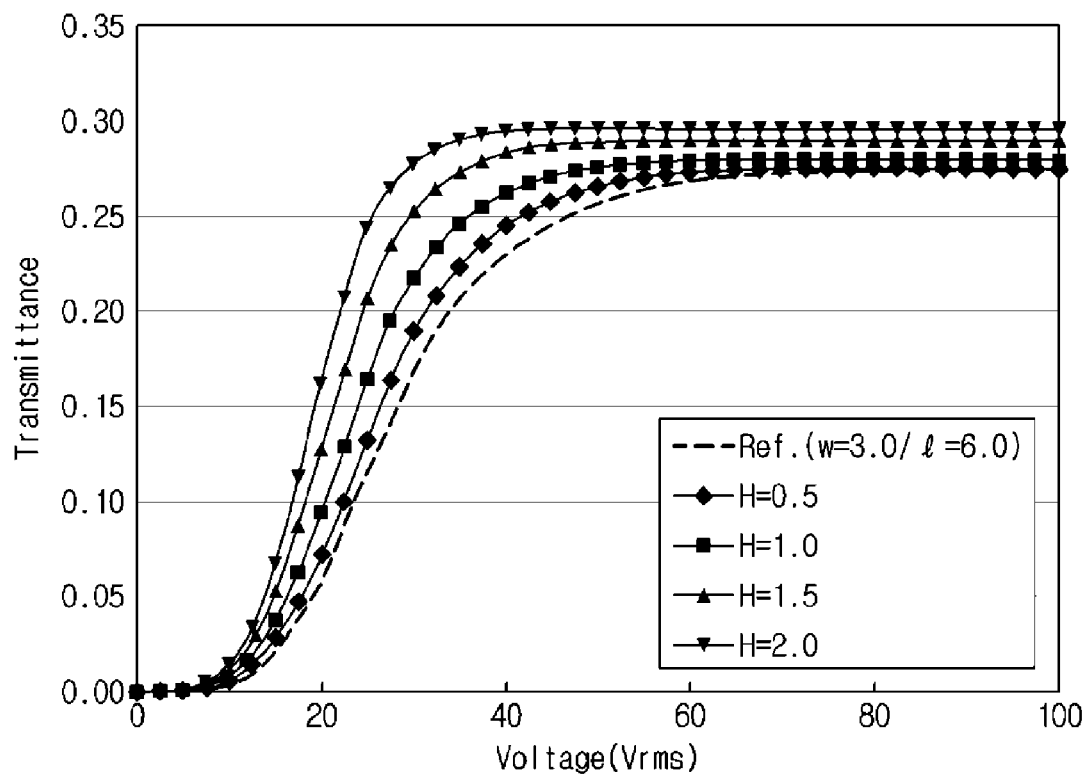
FIGS. 12A and 12B are graphs each illustrating a relationship between transmittance and driving voltage according to the height of a protrusive electrode.
Figure 12B:
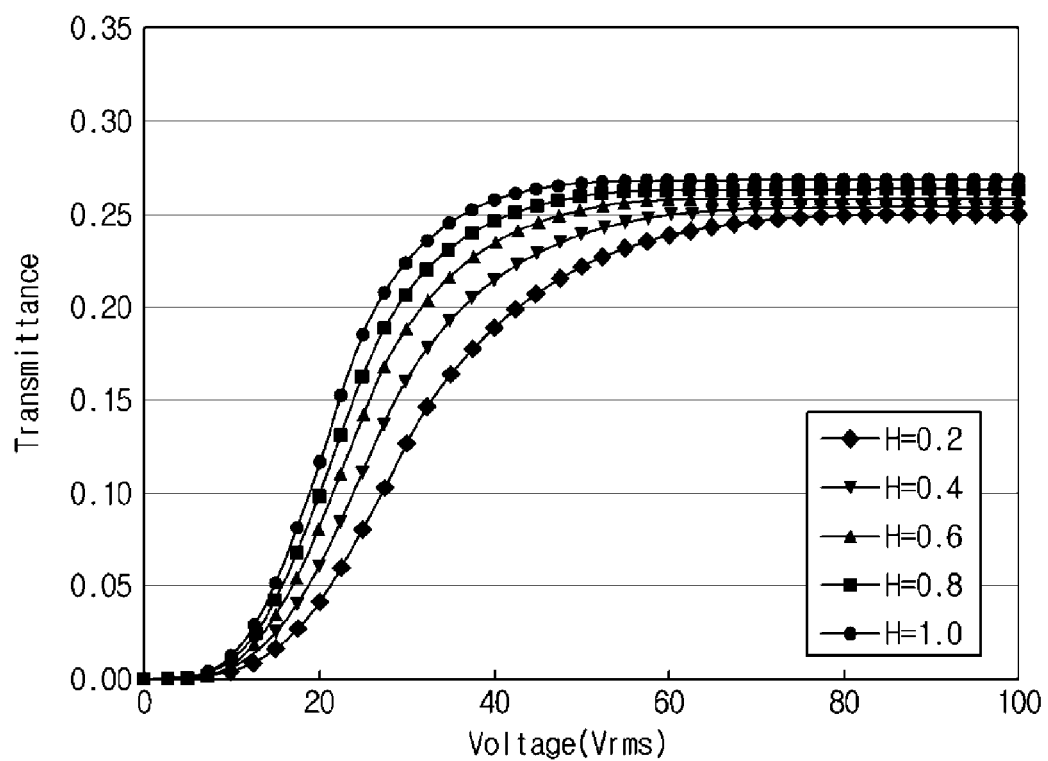

FIGS. 12A and 12B are graphs each illustrating a relationship between transmittance and driving voltage according to the height of a protrusive electrode.

The widths of pixel and common electrodes 150 and 160 may be fixed, e.g., at 3.0 μm, and the distance between the pixel and common electrodes 150 and 160 may be fixed, e.g., at 6.0 μm. Also, the protrusions 170 positioned under the pixel and common electrodes 150 and 160 may be formed in the convex hill shape with a height H. In one example, as seen from FIG. 12A, it is evident that the driving voltage may become lower and transmittance may become higher as the height of the protrusion 170 increases. In other words, it may be confirmed that the transmittance and driving voltage of the liquid crystal panel may be enhanced when the protrusive electrode is formed in a height, e.g., of about 0.5~2.0 μm.

Similarly, the widths of pixel and common electrodes 150 and 160 may be fixed, e.g., at 3.0 μm, and the distance between the pixel and common electrodes 150 and 160 may be fixed, e.g., at 6.0 μm. However, the protrusions 170 positioned under the pixel and common electrodes 150 and 160 may be formed in the trapezoid shape with a height H. In one example, as shown in FIG. 12B, the driving voltage may become lower and transmittance may become higher as the height of the protrusion 170 increases. Moreover, it may be confirmed that the transmittance and driving voltage of the liquid crystal panel may be enhanced when the protrusive electrode is formed in a height, e.g., of about 0.5~5.0 μm.

In this manner, the LCD device according to an embodiment may allow the height of the protrusive electrodes used as the pixel and common electrodes to increase, in order to lower the driving voltage and provide high transmittance. Therefore, the LCD device according to an embodiment may be more efficiently driven than the related art LCD device.

Figure 13:
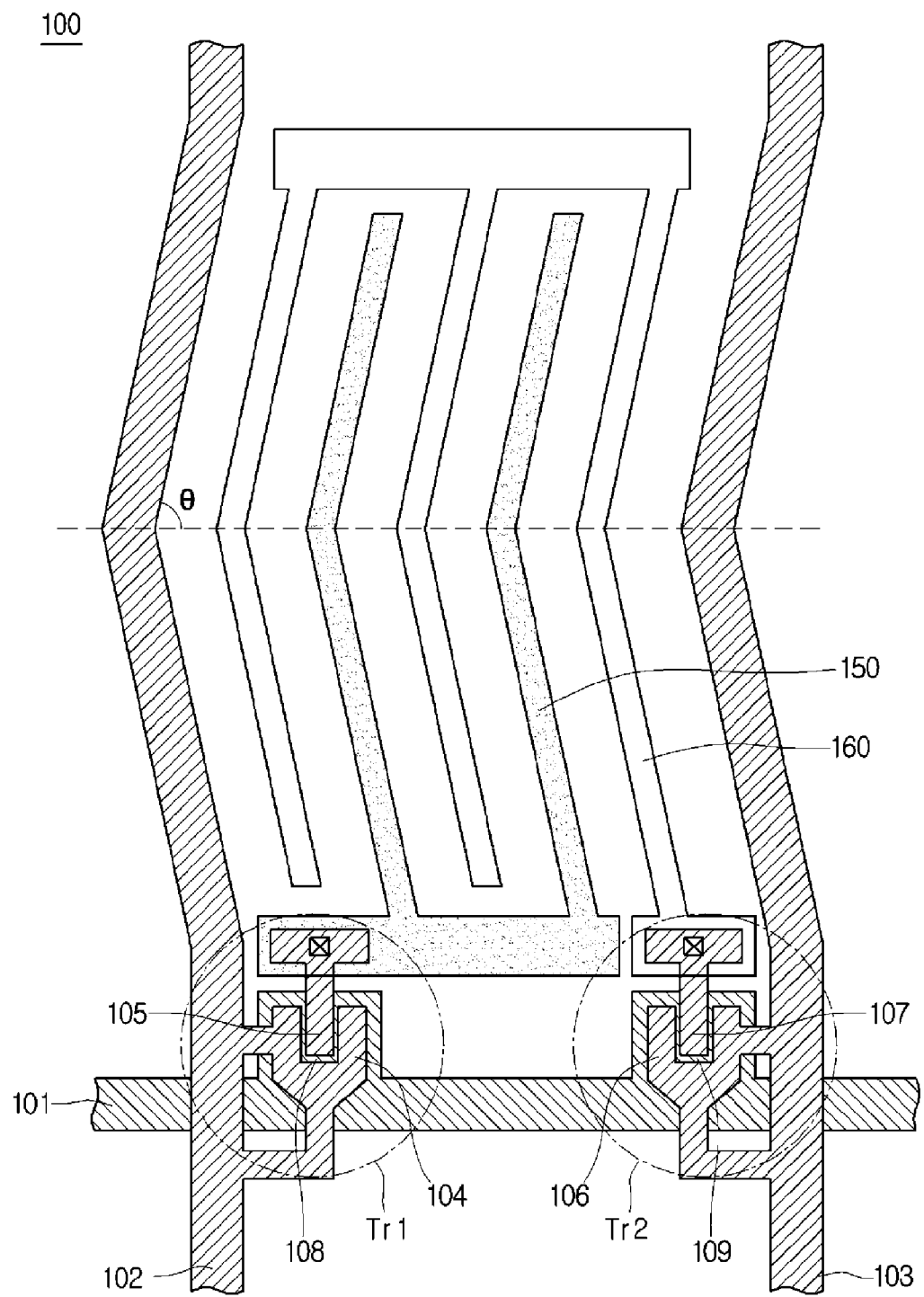
FIG. 13 is a planar view showing an LCD device according to an embodiment.

FIG. 13 is a planar view showing an LCD device according to an embodiment.

With reference to FIG. 13, the LCD device of the present disclosure may include a first substrate 100 on which a gate line 101 may be formed. A gate insulation film may be formed on the first substrate 100 provided with the gate line 101. A data line 102 and a power supply line 103 may be formed on the gate insulation film 102 and may cross the gate line 101. The gate and data lines 101 and 102 crossing each other may define a pixel region. The data and power supply lines 102 and 103 may be separated from each other.

A first thin film transistor Tr1 may be formed at an intersection of the gate and data lines 101 and 102. The first thin film transistor Tr1 may include a first gate electrode 108, a first source electrode 104, and a first drain electrode 105. Also, a second thin film transistor Tr2 may be formed at an intersection of the gate and power supply lines 101, 103. The second thin film transistor Tr2 may include a second gate electrode 109, a second source electrode 106, and a second drain electrode 107.

A pixel electrode 150 and a common electrode 160 may be formed in the pixel region to be separated from and parallel to each other. The pixel electrode 150 and the common electrode 160 may be formed in a symmetrically bent structure about the central portion of the pixel region, allowing the pixel region to have multiple, e.g., at least two, domains (e.g., sub-regions). Similarly, the data line 102 and the power supply line 103 may also be formed in the symmetrically bent structure about the central portion of the pixel region. Moreover, the data and power supply lines 102, 103 and the pixel and common electrodes 150, 160 may be formed to incline from the central portion of the pixel region at an angle of "θ" based on a horizontal line parallel to the gate line 101. The angle of "θ" may be set to a range of 30°~90°. For example, the angle of "θ" may be set to 45°. As such, a color difference due to the variation of a viewing angle may be suppressed.

Also, the pixel and common electrodes 150, 160, arranged alternately with each other within the pixel region, may be formed in the same layer and may completely generate a horizontal electric field. As such, force controlling the liquid crystal molecules may increase. Therefore, display quality may be enhanced.

The first drain electrode 105 of the first thin film transistor Tr1 may be connected to the pixel electrode 150. The second drain electrode 107 of the second thin film transistor Tr2 may be connected to the common electrode 160. Subsequently, a voltage driving mode of the LCD device according to an embodiment will be described.

Figure 14A:
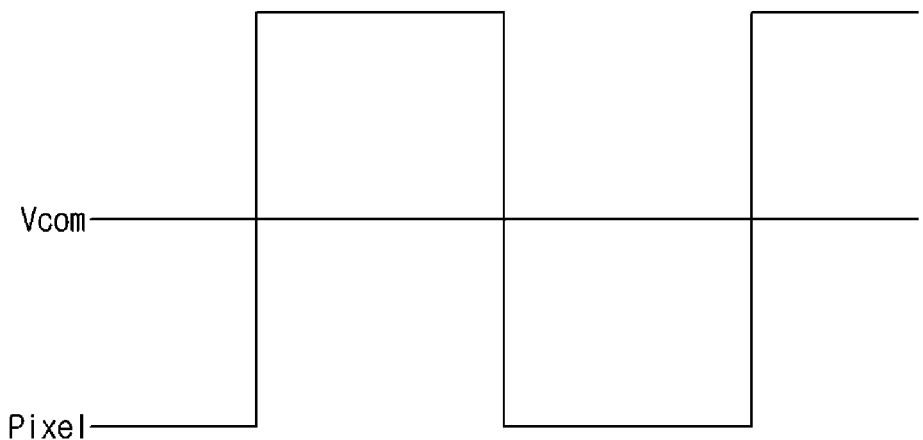
FIG. 14A is a waveform diagram illustrating a voltage driving mode of the related art LCD device.
Figure 14B:
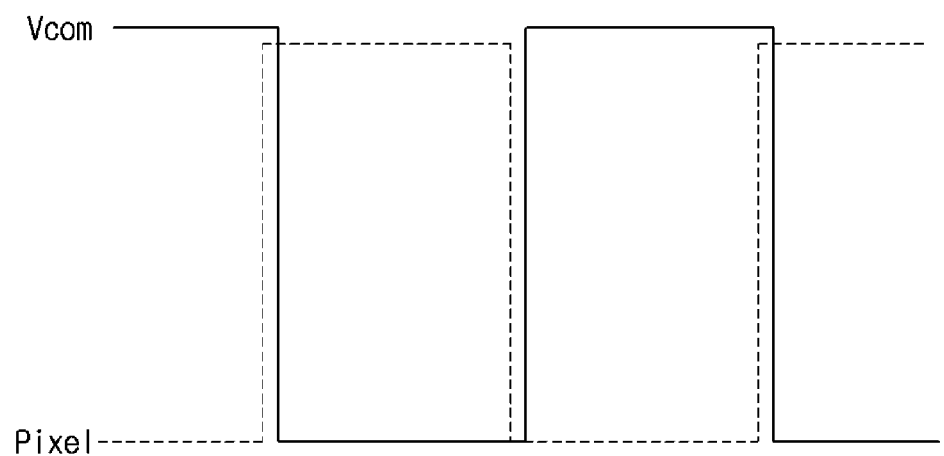
FIG. 14B is a waveform diagram illustrating a voltage driving mode of an LCD device according to an embodiment.

FIG. 14A is a waveform diagram illustrating a voltage driving mode of the related art LCD device. FIG. 14B is a waveform diagram illustrating a voltage driving mode of an LCD device according to an embodiment.

The related art LCD device includes only a single thin film transistor connected to the data line. As such, only a data voltage "Pixel" being transferred through the data line is level-shifted, as shown in FIG. 14A. In other words, the data voltage "Pixel" on the data line has alternately a positive level and a negative level, based on a fixed common voltage Vcom, which is transferred through the power supply line. If the voltage difference between the data voltage "Pixel" and the common voltage Vcom is set to VDD, the data voltage "Pixel" must decrease lower than the common voltage Vcom by VDD in one frame and increase higher than the common voltage Vcom by VDD in the next frame.

On the other hand, the LCD device according to an embodiment may include two thin film transistors respectively connected to the data line and the power supply line. As such, the data voltage "Pixel" being transferred through the data line and the common voltage Vcom being transferred through the power supply line may be simultaneously level-shifted in opposite level directions (e.g., polarity) to each other, as shown in FIG. 14B. If the data voltage "Pixel" is level-shifted up by 2VDD, the common voltage Vcom may be level-shifted down by 2*VDD. In this manner, the data and common voltages "Pixel" and Vcom of the LCD device according to an embodiment may have the same swing width as the data voltage "Pixel" of the related art LCD device. However, the voltage difference between the data and common voltages "Pixel" and Vcom in the LCD device according to an embodiment may become twice that of the related art LCD device. In other words, the LCD device according to an embodiment may apply a driving voltage between the pixel and common electrodes of twice the magnitude of the related art LCD device.

In order to efficiently drive the LCD device according to an embodiment, including the nanocapsule liquid crystal layer, the electrical optics and the physical chemistry of the liquid crystal molecules within the nanocapsule may be enhanced. The electrical optics and the physical chemistry of the liquid crystal molecule will now be described with reference to FIGS. 15 through 17.

Figure 15:
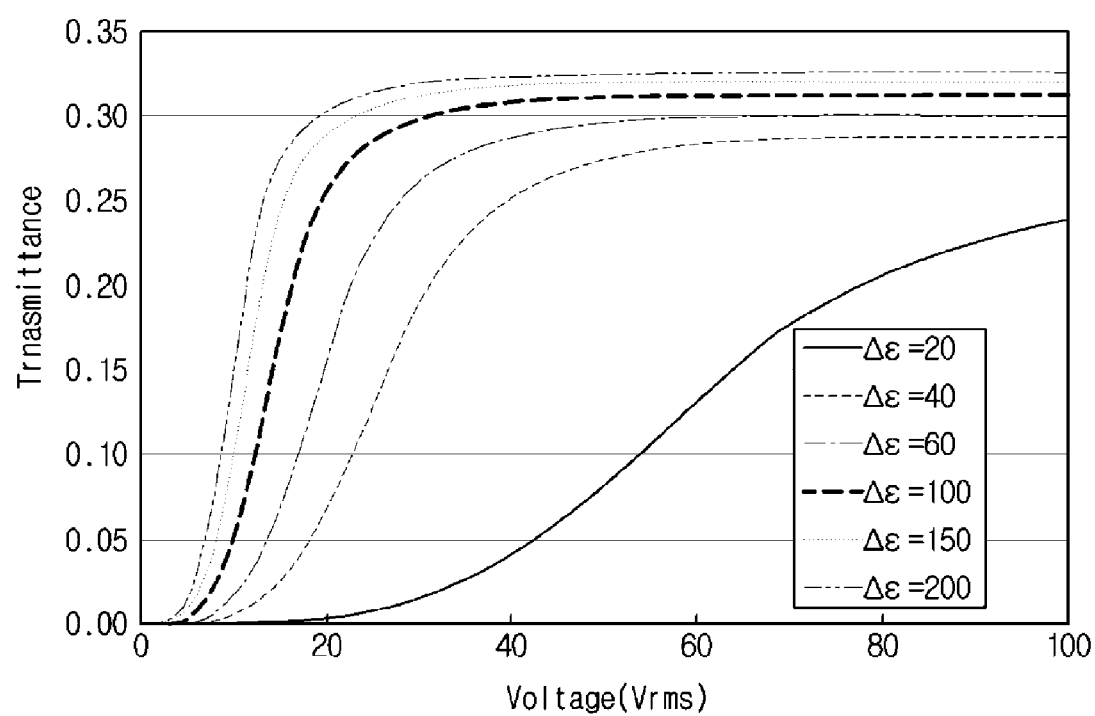
FIG. 15 is a graph illustrating a relationship between transmittance and driving voltage according to a dielectric constant $\Delta\in$ of a liquid crystal molecule.

FIG. 15 is a graph illustrating a relationship between transmittance and driving voltage according to a dielectric constant $\Delta \in$ of a liquid crystal molecule.

FIG. 15 represents results which may be obtained by changing only the dielectric constant $\Delta \in$ of the liquid crystal molecule under the same conditions that the size of the nanocapsule, the thickness "d" of the nanocapsule liquid crystal layer, the refractive index $\Delta n$ of the liquid crystal molecule, and so on, are constantly maintained. The liquid crystal molecule may have a dielectric constant range, e.g., of about 10~400. As shown in FIG. 15, a drive voltage may be lowered and transmittance may increase as the dielectric constant $\Delta \in$ of the liquid crystal molecule becomes larger. With reference to FIG. 15, the dielectric constant $\Delta \in$ of the liquid crystal molecule may be set to a range, e.g., of about 35~200.

Figure 16:
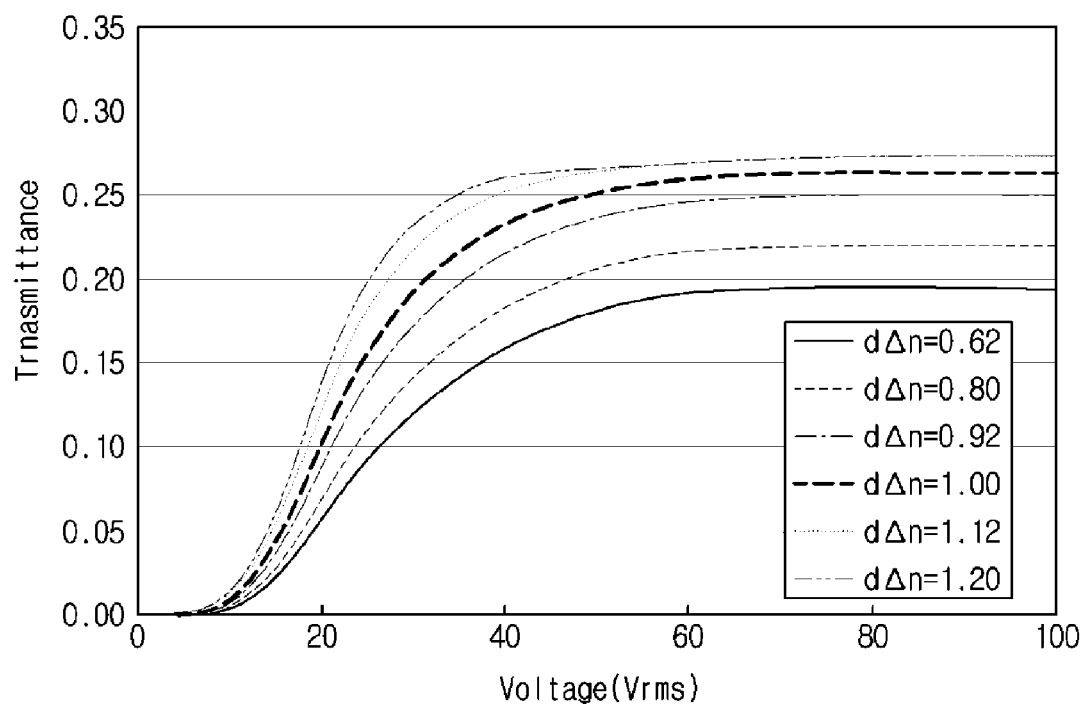
FIG. 16 is a graph illustrating a relationship between transmittance and driving voltage according to a refractive index $\Delta n$ of a liquid crystal molecule.

FIG. 16 is a graph illustrating a relationship between transmittance and driving voltage according to a refractive index $\Delta n$ of a liquid crystal molecule.

FIG. 16 represents resultants which may be obtained by changing only the refractive index $\Delta n$ of the liquid crystal molecule under the same conditions that the size of the nanocapsule, the thickness "d" of the nanocapsule liquid crystal layer, the dielectric constant $\Delta \in$ of the liquid crystal molecule, and so on, are constantly maintained. The liquid crystal molecule may have a refractive index range, e.g., of about 0.10~0.40. As shown in FIG. 16, a drive voltage may be lowered and transmittance may increase as the refractive index $\Delta n$ of the liquid crystal molecule becomes larger. With reference to FIG. 16, the refractive index $\Delta n$ of the liquid crystal molecule may be set to a range, e.g., of about 0.18~0.30.

Figure 17:
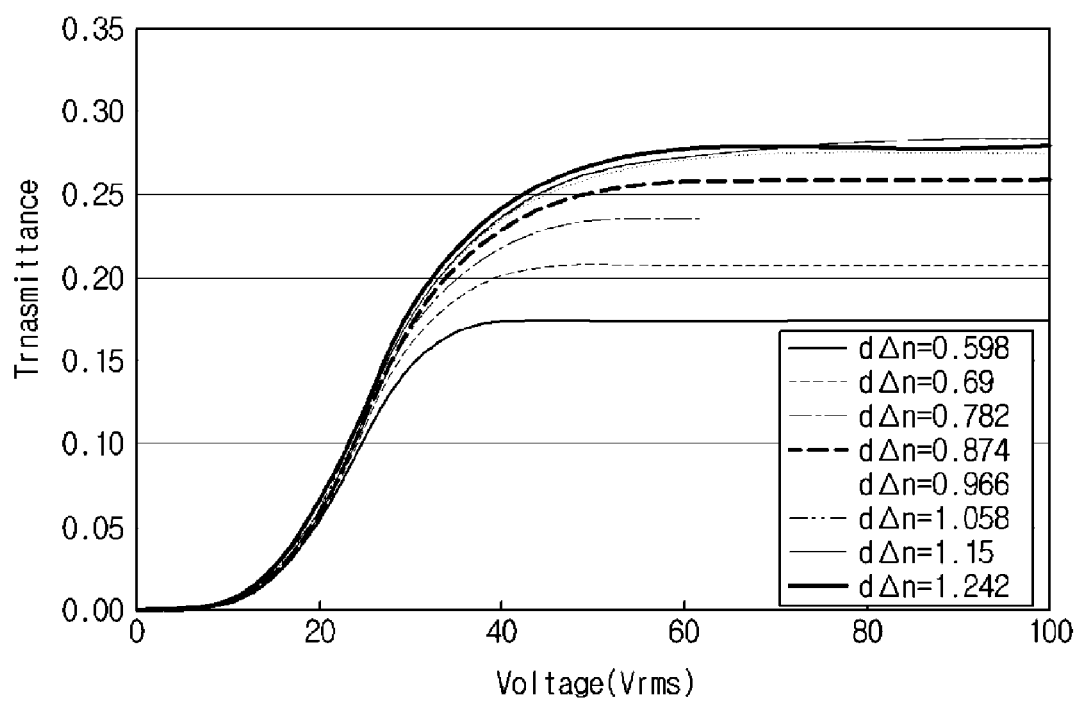
FIG. 17 is a graph illustrating a relationship between transmittance and driving voltage according to a thickness "d" of a nanocapsule liquid crystal layer.

FIG. 17 is a graph illustrating a relationship between transmittance and driving voltage according to a thickness "d" of a nanocapsule liquid crystal layer.

FIG. 17 represents resultants which may be obtained by changing only the thickness "d" of the nanocapsule liquid crystal layer under the same conditions that the size of the nanocapsule, the refractive index $\Delta n$, and the dielectric constant $\Delta \in$ of the liquid crystal molecule, and so on, are constantly maintained. As the nanocapsule liquid crystal layer becomes thicker, transmittance may be enhanced, but a drive voltage may become higher. In other words, it may not be desirable to thickly form the nanocapsule liquid crystal layer. Therefore, as seen from FIGS. 15 and 16, at least one of the refractive index $\Delta n$ and the dielectric constant $\Delta \in$ of the liquid crystal molecule may be adjusted in order to more efficiently drive the LCD device including the nanocapsule liquid crystal layer.

As described above, the LCD device and the fabricating method thereof according to an embodiment may allow the liquid crystal layer, including nano-sized liquid crystal capsules, to be formed on one of a single substrate and a flexible substrate. As such, yield of the LCD device may be enhanced. Also, because the alignment film formation process and the rubbing process may be omitted, process efficiency may be enhanced. Moreover, because the driving mode and structure of the pixel and common electrodes may be improved, efficiency of the driving voltage and transmittance may be enhanced.

Although embodiments have been described with reference to a number of illustrative embodiments thereof, it should be understood that numerous other modifications and embodiments may be devised by those skilled in the art that will fall within the spirit and scope of the principles of this disclosure. For example, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display (LCD) device, comprising a liquid crystal panel, comprising:
    a first substrate, comprising:
        a pixel electrode; and a common electrode separated from the pixel electrode, a ratio of a width of the pixel electrode to a distance between the pixel electrode and the common electrode being in a range of about 1:1 to 1:7; and a nanocapsule liquid crystal layer formed on the first substrate, the nanocapsule liquid crystal layer comprising:
a buffer material; and
nanocapsules, each filled with liquid crystal molecules.

2. The liquid crystal display device of claim 1, wherein a diameter of each of the nanocapsules is in a range of about 1 nm to 320 nm.

3. The liquid crystal display device of claim 2, wherein the diameter of each of the nanocapsules is in a range of about 30 nm to 100 nm.

4. The liquid crystal display device of claim 1, wherein the nanocapsules comprise 25 vol % to 65 vol % of the nanocapsule liquid crystal layer.

5. The liquid crystal display device of claim 1, wherein a dielectric constant $\Delta\in$ of the liquid crystal molecules is in a range of about 35 to 100.

6. The liquid crystal display device of claim 1, wherein a refractive index $\Delta n$ of the liquid crystal molecules is in a range of about 0.18 to 0.30.

7. The liquid crystal display device of claim 1, wherein a difference between an average refractive index $\Delta n$ of the liquid crystal molecules and a refractive index $\Delta n$ of the buffer layer is about 0.1.

8. The liquid crystal display device of claim 1, further comprising:
a second substrate opposed to the first substrate with the nanocapsule liquid crystal layer therebetween;
a gate line and a data line on the first substrate that cross perpendicularly to each other and define a pixel region;
a thin film transistor at an intersection of the gate line and the data line; and
a color filter layer on the second substrate.

9. The liquid crystal display device of claim 1, further comprising:
a second substrate opposed to the first substrate with the nanocapsule liquid crystal layer therebetween;
a gate line and a data line on the first substrate that cross perpendicularly to each other and define a pixel region;
a thin film transistor at an intersection of the gate and data lines; and
a color filter layer on the first substrate, the first substrate being provided with the thin film transistor.

10. The liquid crystal display device of claim 1, further comprising:
a polarizing plate in direct contract with the nanocapsule liquid crystal layer; and
a backlight unit on a rear surface of the liquid crystal panel and configured to:
irradiate light onto the liquid crystal panel; and
emit red, green, and blue light.

11. The liquid crystal display device of claim 1, wherein the liquid crystal panel comprises one of: a flexible panel and a curved panel.

12. The liquid crystal display device of claim 1, wherein the pixel electrode and the common electrode have a same width.

13. The liquid crystal display device of claim 1, wherein the pixel electrode and the common electrode comprise a protrusive structure.

14. The liquid crystal display device of claim 13, wherein the protrusive structure comprises:
at least one protrusion layer; and
at least one metal layer.

15. The liquid crystal display device of claim 13, wherein respective heights of the pixel electrode and the common electrode are in a range of about 0.5 μm to 5.0 μm.

16. The liquid crystal display device of claim 1, wherein a thickness of the nanocapsule liquid crystal layer is in a range of about 1 μm to 10 μm.

17. The liquid crystal display device of claim 1, further comprising:
a gate line on the first substrate;
a data line that crosses the gate line and defines a pixel region;
a power supply line that crosses the gate line and is separated from the data line;
a first thin film transistor connected to the gate line and the data line; and
a second thin film transistor connected to the gate line and the power supply line,
wherein the first thin film transistor is configured to supply the pixel electrode with a level-shifted data voltage, and
wherein the second thin film transistor is configured to supply the common electrode with a level-shifted common voltage in a level-shifting polarity opposite to the data voltage.

18. The liquid crystal display device of claim 17, wherein:
the data line, the power supply line, the pixel electrode and the common electrode are in a structure that is symmetrically bent about a central portion of the pixel region; and
wherein the pixel region has at least two domains.

19. A method of fabricating a liquid crystal display (LCD) device, the method comprising:
forming a thin film transistor on a first substrate, comprising:
forming a pixel electrode connected to the thin film transistor; and
forming a common electrode which is separated from the pixel electrode;
forming a nanocapsule liquid crystal layer on the first substrate; and
providing a liquid crystal panel,
wherein the nanocapsule liquid crystal layer comprises:
a buffer material; and
nanocapsules each filled with liquid crystal molecules, and
wherein a ratio of a width of the pixel electrode to a distance between the pixel electrode and the common electrode is in a range of about 1:1 to 1:7.

20. The method of claim 19, wherein the pixel electrode and the common electrode have a same width.

21. The method of claim 19, wherein the pixel electrode and the common electrode are formed in a protrusive structure.

22. The method of claim 21, wherein respective heights of the pixel electrode and the common electrode are formed in a range of about 0.5 μm to 5.0 μm.

23. The method of claim 19, wherein a thickness of the nanocapsule liquid crystal layer is formed in a range of about 1 μm to 10 μm.

24. The method of claim 19, wherein the formation of the thin film transistor comprises:
forming a gate line, a first gate electrode, and a second gate electrode on the first substrate;
forming a gate insulation film on the first substrate provided with the gate line, the first gate electrode, and the second gate electrode;
forming a semiconductor layer on the gate insulation film; and forming a data line crossing the gate line, a power line crossing the gate line and separated from the data line, a first source electrode, a second source electrode, a first drain electrode, and a second drain electrode on the first substrate with the semiconductor layer, wherein the gate line and the data line cross each other and define a pixel region, wherein the first drain electrode is configured to supply the pixel electrode with a level-shifted data voltage, and wherein the second drain electrode is configured to supply the common electrode with a level-shifted common voltage in a level shifting polarity opposite to the data voltage.

25. The method of claim 24, wherein:

the data line, the power supply line, the pixel electrode, and the common electrode are formed in a structure that is symmetrically bent about a central portion of the pixel region; and wherein the pixel region has two domains.

\* \* \* \* \*